June 27, 1967  J. W. HICKS, JR  3,328,143
METHOD OF MAKING LIGHT-CONDUCTING OPTICAL
MULTIFIBER STRUCTURES
Filed Jan. 24, 1962  2 Sheets-Sheet 1
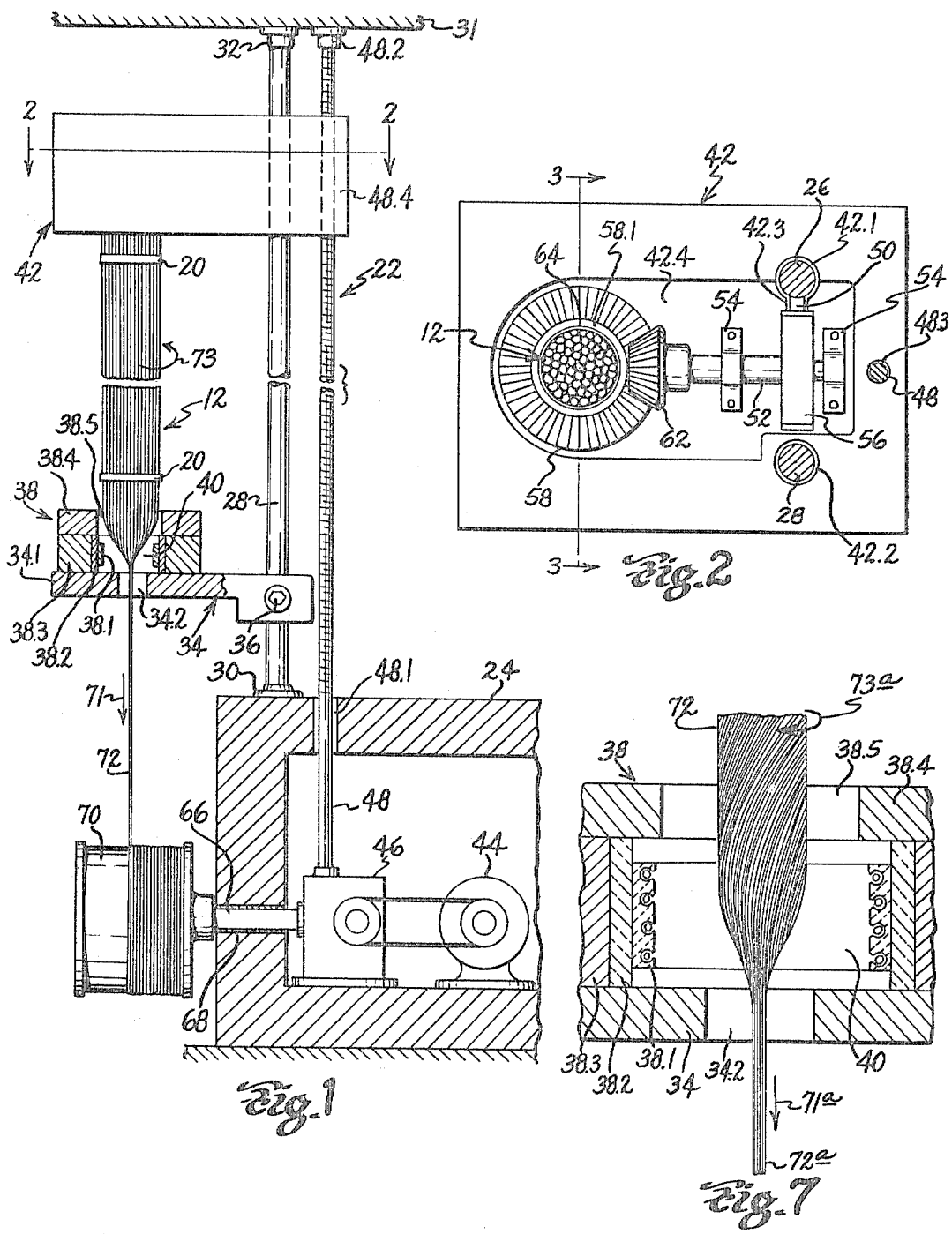
INVENTOR
JOHN W. HICKS, JR.
BY Louis L. Gagnon
James P. McFadden
ATTORNEYS

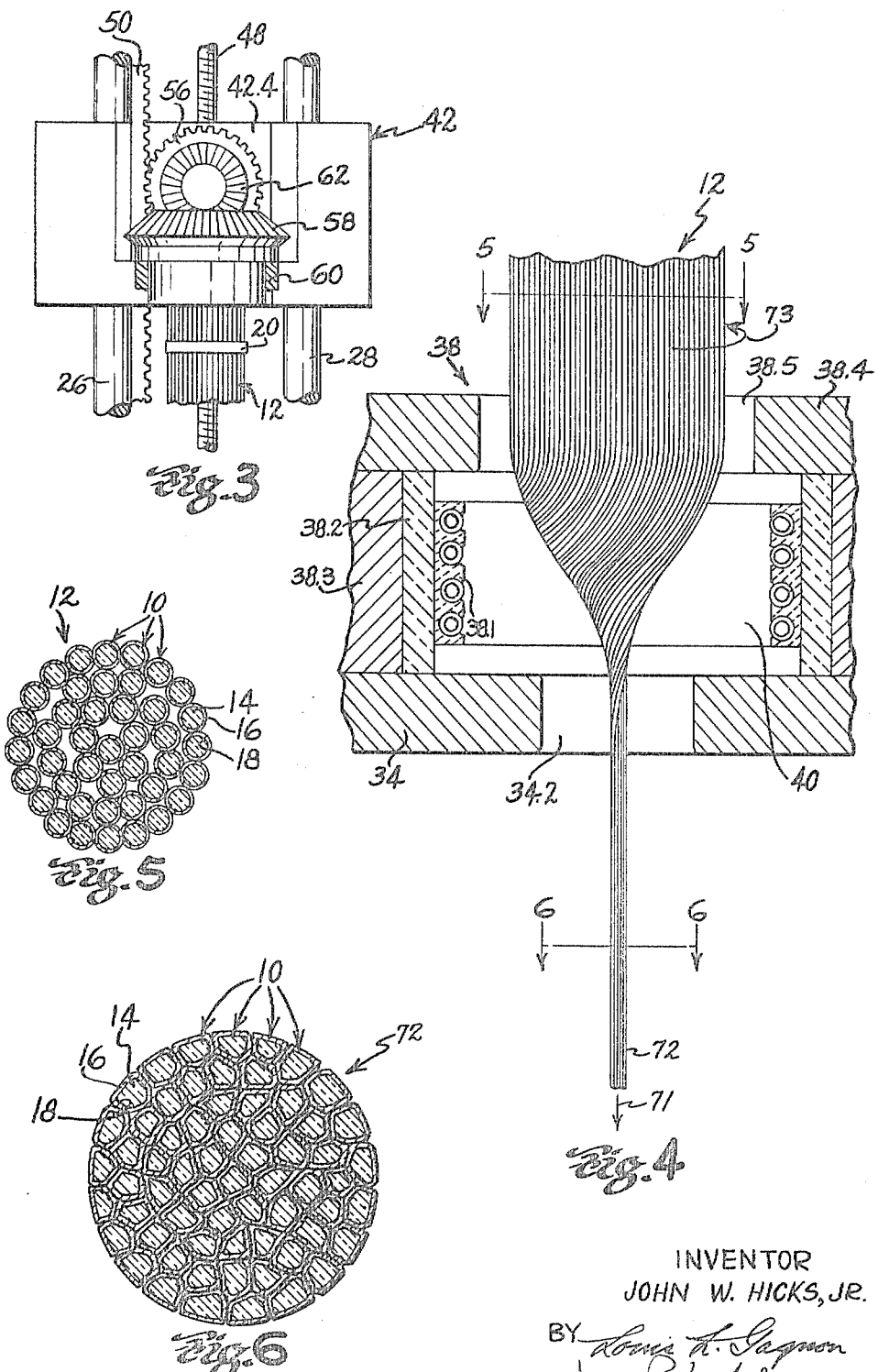

United States Patent Office 3,328,143
Patented June 27, 1967

3,328,143
METHOD OF MAKING LIGHT-CONDUCTING
OPTICAL MULTIFIBER STRUCTURES
John Wilbur Hicks, Jr., Fiskdale, Mass., assignor to American Optical Company, Southbridge, Mass., a voluntary association of Massachusetts
Filed Jan. 24, 1962, Ser. No. 173,317
5 Claims. (Cl. 65—4)

The field of this invention is that of fiber optical image-transfer devices, and the invention relates, more particularly, to novel and improved methods for making multifiber structures to be used in the manufacture of such image-transfer devices.

In the manufacture of fiberscopes, fiber optical faceplates and other fiber optical image-transfer devices, it is conventional practice to secure a large number of multifiber units of selected length in side-by-side bundled relation, thereby to build up devices of the desired cross-sectional size. These multifiber units or structures each comprise a plurality of individual light-conducting optical fibers which have been securely fused together, preferably in vacuum-tight relation, to form an integral unit, and each individual fiber embodies a light-conducting core and a light-insulating cladding such that the fiber is adapted to conduct light through the fiber core from end-to-end thereof in accordance with the well known principles of total internal reflection.

In a known process for forming multifiber units, a plurality of individual fibers of relatively large cross-sectional size are arranged in side-by-side bundled relation and are heated to a fusing and drawing temperature while held in said reltaion to permit simultaneous reduction of the cross-sectional size of the individual fibers and to permit fusing of the fibers together, usually into vacuum-tight relation, to form a multifiber unit. This simultaneous drawing and fusing process requires careful control to prevent the separation of fibers or groups of fibers from other fibers contiguous thereto in the multifiber unit. Similarly, other known processes for forming multifiber units which are adapted to overcome the tendency of unit fibers to separate are complex and inconvenient and tend to waste fiber materials.

It is an object of this invention to provide novel and improved methods for making multifiber units; to provide such methods of multifiber structure manufacture which are not wasteful of fiber material; to provide such methods of multifiber structure manufacture which can be easily and accurately controlled; and to provide simple and convenient methods for manufacturing optical multifiber units in which unit fibers can be securely fused together in vacuum-tight relation.

It is also an object of this invention to provide a method or process of multifiber structure manufacture comprising the steps of providing a plurality of energy-conducting fibers of selected cross-sectional size each having an energy-conducting core and an energy-insulating cladding, arranging the fibers in side-by-side relation to form a bundle, heating the bundle from one end to a drawing and fusing temperature of the fiber materials, and drawing the bundle from said one end for reducing the fibers to a relatively smaller cross-sectional size, the method further including the step of twisting the opposite ends of the fiber bundle relative to each other during the process for bringing the bundle fibers into intimately contacting relation to be securely fused together.

Other objects, advantages and details of the methods of this invention appear in the following detailed description of a preferred embodiment of the invention, the detailed description referring to the drawings in which:

FIG. 1 is a side elevation view of a drawing apparatus which is shown partially in section for illustrating the basic process steps of the method of this invention;

FIG. 2 is a section view to enlarged scale along line 2—2 of FIG. 1;

FIG. 3 is a section view to enlarged scale along line 3—3 of FIG. 2;

FIG. 4 is a partial side elevation view similar to FIG. 1 drawn to enlarged scale;

FIG. 5 is a section view along line 5—5 of FIG. 4;

FIG. 6 is a section view to substantially enlarged scale along line 6—6 of FIG. 4; and FIG. 7 is a partial side elevation view similar to FIG. 4 illustrating an alternative method of multifiber manufacture provided by this invention.

In forming multifiber structures according to the process of this invention, a plurality of energy-conducting fibers 10 are arranged in side-by-side relation to form a bundle 12 as shown in FIGS. 1, 2 and 5. Each of these fibers is preferably, but not necessarily, round in cross-section, as shown in FIG. 5, and embodies an energy-conducting core 14 and an energy-insulating cladding 16. For example, where a light-conducting optical multifiber is to be formed, the fibers 10 can each embody a core 14 of a light-transmitting material such as a flint glass of relatively high index of refraction and a cladding 16 of a light-transmitting material such as a soda lime glass of relatively low index of refraction. Such optical fibers 10 can be formed in any conventional manner with an interface 18 between the core and cladding of each fiber so that the fiber will be adapted to conduct light through the fiber core from end-to-end thereof in accordance with well known principles of total internal reflection. The fibers 10 are preferably of substantially uniform length and cross-sectional size and are of a cross-sectional size substantially larger than the size that the fibers are intended to have in a finished multifiber unit.

The fibers 10 are preferably arranged in side-by-side relation throughout at least a portion of their length to form a generally round bundle 12 as shown in FIGS. 2 and 5 and can be temporarily secured in bundled relation by any conventional means, if desired. For example, the fibers 10 can be held in bundled relation by straps or strings 20 as shown in FIG. 1 or by the use of ring clamps or sleeves or other suitable means. If desired, the fibers 10 can also be partially fused together along their points of mutual contact for permanently securing the fibers in said bundled relation. However, it should be understood that such means for temporarily holding the fibers in bundled relation are not absolutely required and that the bundle 12 can be placed in a drawing apparatus as described below without reliance upon such temporary holding means.

The fiber bundle 12 is then secured within a suitable fiber drawing apparatus such as that illustrated at 22 in FIG. 1. Such an apparatus can include a base 24 upon which a pair of columns 26 and 28 are mounted by means of flanged bushings 30 or the like, the columns extending vertically in spaced, parallel relation and being supported at their upper ends by means of flanged bushings 32 or the like which can be secured to the ceiling 31 of the room in which the apparatus 22 is housed.

A support plate 34 is preferably apertured to fit around the columns 26 and 28 so that the plate can be moved to a selected position along the columns and can be secured in such position by means of set screws 36 or the like as will be understood. The plate 34 is preferably adapted to extend outwardly from the columns at one end 34.1 beyond the edge of the apparatus base 24 as shown, and is adapted to function as a supporting shelf for a furnace 38. For this purpose, the plate can be apertured as at 34.2 adjacent the plate end 34.1.

The furnace 38 can be of any conventional type but preferably comprises an annular electrical-resistance type of heating element 38.1 which is mounted in a refractory material within a ring 38.2 of ceramic or other insulating material and which is disposed in generally concentric relation with the plate aperture 34.2. If desired, the furnace 38 can also include a ring 38.3 for surrounding and protecting the insulating ring 38.2 and can include a cover 38.4 having a central aperture 38.5 which is slightly larger than the diameter of the fiber bundle 12. As will be understood, this arrangement of the furnace 38 establishes a heating zone 40 which is open at opposite ends.

Another plate support 42 is apertured at 42.1 and 42.2 (see FIG. 2) to fit in sliding relation around the columns 26 and 28, the plate 42 preferably extending in generally coextensive relation to the furnace-supporting shelf plate 34. The plate 42 is intended to support the fiber bundle 12 for feeding the bundle into the heating zone 40 previously described, and for this reason the plate 42 is adapted to slide upwardly and downwardly along the columns 26 and 28 in a controlled manner. Accordingly, a conventional electric motor 44 or the like can be mounted within the apparatus base 24, for example, and can be drivingly connected to a gear box or speed reducing mechanism 46, the gear box being adapted to rotate a lead screw 48 at a selected rate. The lead screw can extend vertically through a clearance passage 48.1 in the base 24 and can be supported at its upper end in conventional bearing means 48.2 secured to the ceiling 31 of the room in which the apparatus 22 is housed. This lead screw can be threadedly engaged with the fiber bundle feed support plate 42 as at 48.3 and can be thereby adapted for raising and lowering the plate 42 upon the columns 26 and 28 in a controlled manner as will be understood.

The plate 42 is not only intended to support the fiber bundle 12 and to feed the bundle axially into the heating zone 40 but, according to this invention, can also be adapted to rotate the bundle around its longitudinal axis as the bundle is fed into the heating zone. Accordingly, a rack gear 50 can be secured to the column 26, in any suitable manner to extend longitudinally along a section of the column, and the plate aperture 42.1 can have an extension 42.3 adapted to fit over the rack gear 50. Further, the plate 42 is provided with a recess 42.4 which is adapted to accommodate means for rotating the fiber bundle 12. For example, a shaft 52 can be mounted within journals 54 in the plate recess 42.4, and a spur gear 56 mounted upon one end of the shaft can be adapted to mesh with the rack gear 50. A bevel gear 58 can be mounted upon suitable thrust bearings 60 within the plate recess 42.4 and can be drivingly connected to the shaft 52 by means of a mating bevel gear 62 secured upon the shaft oppositely of the spur gear 56. The bevel gear 58 can have a central axial opening 58.1 for receiving one end of the fiber bundle 12, the bundle being secured within the opening 58.1 by cement 64 or by use of suitable clamp means or the like. The plate 42 is adapted to support the fiber bundle 12 in axially aligned relation with the furnace 38 previously described.

In a preferred arrangement of the apparatus 22, the gear box 46 is also provided with a driven shaft 66 which is journaled in a bushing 68 in the base 24 and which extends outside the base to support and rotatably drive a drum 70. The drum is adapted to be rotated directly beneath the aperture 34.2 in the furnace support plate.

According to this invention, the fiber bundle 12 can be supported at one end by the plate 42 by being cemented or otherwise secured in the opening 58.1 of the bevel gear 58 as previously described, and the opposite end of the fiber bundle can extend through the aperture 38.5 in the furnace cover into the heating zone 40. The furnace 38 can then be actuated to heat the bundle material in the heating zone to a convenient drawing and fusing temperature of the bundle material. The heat-softened material of the fiber bundle is then gripped and drawn downwardly for drawing out the bundle material to form a multifiber unit 72 of relatively small cross-sectional size. In one method for initiating drawing out of the bundle material, a glass rod (not shown) can be manually inserted through the plate aperture 34.2 into contact with the heat-softened bundle material. When the rod has been fused securely to the heat-softened bundle end, the rod can be drawn down manually for drawing out material from the fiber bundle. The glass rod can then be flame-cut or otherwise severed from the material of the fiber bundle, and the drawn-out bundle material can be wrapped around or otherwise secured to the drum 70 in any suitable manner. Since this method of initiating the drawing process is conventional, further description thereof is not believed to be required.

At the same time that drawing of the bundle material is initiated, the electric motor 44 can be actuated for rotating the lead screw 48 and the drum shaft 66. As will be understood, rotation of the drum 70 is adapted to cause continuous drawing out of the material of the bundle 12 in the direction of the arrow 71 for forming the multifiber structure 72 of substantial length, the multifiber being wound upon the drum in side-by-side convolutions as it is drawn. Any conventional means for assuring that convolutions of the multifiber structure are wound in side-by-side relation upon the drum 70 can be employed if desired. The multifiber structure will cool in the space between the heating zone 40 and the drum 70 before the multifiber structure is wound upon the drum. As the multifiber structure 72 is drawn by rotation of the drum 70, rotation of the lead screw 48 is adapted to axially feed the fiber bundle 12 into the heating zone 40. As will be understood, the rate of drum rotation can be adapted to draw bundle material from the heating zone 40 at a selected rate, and the rate of lead screw rotation can be adapted to feed bundle material into the heating zone at a related but slower linear rate, thereby to maintain a constant amount of bundle material in a heat-softened state within the heating zone. As will be understood, this drawing action is adapted to reduce the diameter of individual fiber cores and claddings to a substantially uniform extent so that the cores and claddings will retain their proportions relative to each other but will be substantially reduced in size. As soon as a short length of multifiber structure 72 has been drawn so that the bundle fibers are fused together to at least a limited extent, the temporary bundle-restraining straps or strings 20, if used, can be removed from the bundle 12.

As the lead screw 48 moves the plate 42 downwardly for feeding the fiber bundle into the heating zone 40, the spur gear 56 (see FIG. 3) will be rotated by its engagement with the rack gear 50, thereby to rotate the bevel gear 58 and the fiber bundle 12 in the direction of the arrow 73 at a predetermined rate. In this manner, the opposite ends of the fiber bundle 12 will be rotated relative to each other around the longitudinal axis of the bundle, and, since the bundle material will be quite soft only within the heating zone 40, will cause twisting of the fibers around the bundle axis within that zone. This twisting action can pull the bundle fibers inwardly toward the bundle axis to bring the fiber into intimately contacting relation for compactly fusing the fibers together, preferably in vacuum-tight relation as shown in FIG. 6. However, the twisting action can be conveniently regulated so that the twist imparted to the bundle fibers will not substantially interfere with the function of the multifiber structures 72 formed according to this process.

For example, where the fixers 10 embody barium flint glass cores 14 of about 1.66 index of refraction and soda lime glass claddings 16 of about 1.52 index of refraction, and where the fibers have an initial diameter of about 0.040 inch, the fibers can be heated to a temperature of approximately 1300° F. within the heating zone 40 in order to permit drawing of the multifibers 72. If the fiber bundle is to be drawn for reducing the diameter of individual fibers 10 to about one-fortieth of their original diameter, the bundle 12 can be fed into the heating zone 40 at a rate of about one-eighth inch per minute, and the multifiber structure 72 can be drawn out of the heating zone at a rate of about 200 inches per minute. In such a process, the bundle 12 can be rotated at a rate of about one-thirty-second of a revolution per minute, thereby to maintain about one-half of a revolution of twist in a heating zone 40 of about two inches length as shown in FIG. 4. Such a one-half revolution twist in a 2-inch length of the fibers will be adequate to pull the bundle of fibers 10 into compactly fused vacuum-tight relation within the heating zone but will introduce only about one revolution of twist in a drawn-out multifiber structure 72 of about 6400 inches length. As will be understood this rate of twist will be slow relative to the rate at which the multifiber structure is drawn and will spread said twist to provide an insignificant twist per unit length of said fused multifiber structure. Such a twist in the multifiber structure 72 will not interfere with the function of the multifiber structure and will not even be detectable in the relatively short lengths of multifiber structures such as would be employed in the manufacture of fiber optical faceplates and the like.

It will be noted that, in the proces above-described, the fibers 10 are arranged or assembled in bundled relation, are heated to a drawing and/or fusing temperature, and are drawn and twisted for reducing the cross-sectional size of the fibers and for fusing the fibers together to form a multifiber structure. The twisting of the fiber bundle 12 is adapted to assure that the fibers 10 are held or are pulled into intimately contacting relation with each other while the fiber materials are at a fusing temperature so that the individual fibers will fuse together. Accordingly, twisting of the fiber bundle can be performed at any stage in the described process for achieving this result within the scope of this invention.

It should also be understood that the apparatus 22 has been described by way of illustration and without intended limitation of the process of this invention. For example, the illustrated apparatus 22 is shown to include drum-winding of the multifiber structure 72 as it is drawn, but it will be understood that, if the multifiber structure 72 is to be of relatively large cross-section, the multifiber structure will not have sufficient flexibility to be wound upon a drum and will have to be drawn in straight, i.e. twisted but unwound, lengths. Further, although the apparatus 22 is adapted for introducing a twist in the bundle fibers within the heating zone 40 by rotating the fiber bundle 12, the bundle 12 could be fed into the heating zone without rotation, and twist could be imparted to the bundle fibers by rotation of the drawn multifiber structure 72 just beneath the heating zone 40.

The method of this invention has been described thus far with regard to the formation of multifiber units from a plurality of individual light-conducting fibers 10. However, a plurality of multifiber structures formed according to this invention or formed in conventional manner could also be arranged in side-by-side relation to form a bundle similar to the bundle 12. This bundle of multifiber structures could then be processed in the manner previously described with reference to the bundle 12 for forming what is generally called a multi-multifiber unit, each preformed multifiber structure being considered and treated in the same manner as a single light-conducting fiber in the process previously described. Of course, this process could be repeated any desired number of times for forming a finished unit embodying individual fibers of extremely small diameter which have been fused together in side-by-side relation.

In an alternative embodiment of the process of this invention, multifiber structures having substantially no twist whatsoever can be conveniently manufactured. In this process a multifiber such as the multifiber structure 72 can be drawn in accordance with the process described with reference to FIGS. 1–6. However, the individual fibers 10 embodied in the multifiber structure 72 should not be drawn out to such a length as to fully reduce the individual fiber diameters to the diameters desired in a finished multifiber structure. For example, where the original fibers embodied in a bundle 12 are of about 0.040 inch diameter and are to be ultimately drawn for reducing individual fiber diameters to about 0.001 inch diameter, the multifiber structure 72 formed in the manner above described can be drawn out at a rate such that the individual fibers embodied therein are about five times larger than the diameter to which they will ultimately be drawn. During this process, the individual fibers can be securely fused together by rotation of the fiber bundle 12 in one direction as described above. After cooling, a length of this drawn multifiber structure 72 can be secured in the apparatus 22 in place of the fiber bundle 12 so that one end of the multifiber structure length is held by the gear 58 and so that the opposite end thereof extends into the heating zone 40 of the apparatus, thereby to be heated to a fusing and drawing temperature of the multifiber structure length. The multifiber structure length 72 can then be drawn in a manner similar to that described with reference to drawing of the fiber bundle 12. That is, the multifiber structure length 72 can be fed into the apparatus heating zone 40 at a relatively slow rate as a relatively smaller multifiber structure 72a is drawn out through the plate aperture 34.2 in the direction of the arrows 71a at a relatively faster rate, thereby to reduce the diameter of individual fibers embodied in the multifiber structure to the desired ultimate extent as shown in FIG. 7. The apparatus 22 can also be adapted in any conventional manner (not shown) to rotate the multifiber structure length 72 at a predetermined rate in the direction of the arrow 73a opposite to the direction of the original twist embodied in the multifiber structure length 72. See FIG. 7. The opposite ends of the multifiber structure length can thus be rotated relative to each other, and since the material of the multifiber structure length will be relatively soft only within the heating zone, will cause twisting of the individual fibers within that zone. As will be understood, the rate and direction of rotation of the multifiber structure length 72 can be regulated relative to the inherent twist embodied in the multifiber structure 72 to cause reverse twisting of the multifiber structure during this second drawing step to remove substantially all twist from the fiber embodied in the final multifiber structure 72a.

In a second alternative embodiment of this invention, a multifiber structure 72 can be drawn in accordance with the process described with reference to FIGS. 1–6. However, the individual fibers 10 embodied in the multifiber structure 12 should not be drawn out to such a length as to fully reduce the individual fiber diameters to the diameters desired in a finished multifiber structure. For example, the multifiber structure 72 can be drawn out at a rate such that individual fibers embodied therein are about five times larger than the diameter to which they will ultimately be drawn. During this process, the individual fibers can be securely fused together by rotation of the fiber bundle 12 in one direction as described above with reference to FIGS. 1–6. After cooling, a length of this drawn multifiber structure 72 can be secured in the apparatus 22 in the manner described with reference to FIG. 7. The multifiber structure length 72 can then be drawn for reducing the diameter of individual fibers embodied in the multifier structure to the desired extent as will be understood. However, during this second or redrawing step, the multifiber structure length is not rotated as is the case the multifiber structure is in the process described in FIG. 7. Thus, the twist imparted to the fibers during the original drawing of the multifiber structure length will not be removed therefrom. However, the second or redrawing of the multifiber structure length will substantially increase the length of the multifiber structure length so that the degree of twist embodied therein will be spread over a substantial length of the multifiber structure and will be thereby reduced to a point which will not be significant in the customary applications of such multifiber structure lengths. Since the process of redrawing the multifiber structure length without removing twist therefrom differs from the process shown in FIG. 7, only by omission of the rotation indicated in FIG. 7 by the arrow 73a, the second alternative embodiment of this invention has not been separately illustrated in the drawings.

It should be understood that the processes described herein are intended for the purpose of illustrating this invention but that the invention includes all modifications and equivalents of the described processes that fall within the scope of the appended claims.

Having described my invention, I claim:

1. The method of making a multifiber structure for use in forming image-transfer devices comprising the steps of providing a plurality of energy-transmitting fibers each embodying at least one energy-conducting core having an energy-insulating cladding, assembling the fibers in side-by-side relation to form a bundle, heating the bundle fibers progressively along the length of the bundle from one end to the other to a fusing and drawing temperature of the fiber materials, continuously drawing out the bundle from said one end as said fiber materials are heated to said temperature for reducing the cross-sectional size of the fibers to a uniform extent throughout a substantial length of the fibers, and twisting the fiber bundle during performance of said steps for fusing the bundle fibers together to form a multifiber structure.

2. The method of making a light-conducting multifiber structure for use in forming image-transfer devices comprising the steps of providing a plurality of light-conducting fibers each having a light-conducting core of a material of relatively high index of refraction and a light-insulating cladding of a material of relatively low index of refraction, assembling the fibers in side-by-side relation to form a bundle, establishing a heating zone, feeding the fiber bundle axially through the heating zone at a relatively slow rate for progressively heating the bundle to a fusing and drawing temperature of the fiber materials from one end of the bundle to the other, continuously drawing out the fibers from said one end of the bundle at a relatively fast rate as the fiber materials are heated to drawing temperature in said heating zone for reducing the cross-sectional size of the fibers to a uniform extent throughout a substantial length of the fibers, and rotating opposite ends of the bundle fibers relative to each other around the longitudinal axis of the bundle to introduce a twist in the fibers during drawing of the fiber for securely fusing the bundle fibers together to form a multifiber structure.

3. The method of making a light-conducting multifiber structure for use in forming image-transfer devices comprising the steps of providing a plurality of light-conducting fibers each having a light-conducting core of a material of relatively high index of refraction and a light-insulating cladding of a material of relatively low index of refraction, assembling the fibers in side-by-side relation to form a bundle, establishing a heating zone, feeding the fiber bundle axially into the heating zone at a relatively slow rate for progressively heating the bundle to a fusing and drawing temperature of the fiber materials from one end of the bundle to the other, continuously drawing the fibers out of the heating zone from said one end of the bundle at a relatively faster rate for reducing the cross-sectional size of the fibers to a uniform extent throughout a substantial length of the fibers, and rotating opposite ends of the fiber bundle relative to each other around the longitudinal axis of the bundle during drawing of the fibers to introduce at least one-half revolution of twist in the fibers within the heating zone for fusing the bundle fibers securely together to form a multifiber structure.

4. The method of making a light-conducting multifiber structure for use in forming image-transfer devices comprising the steps of providing a plurality of light-conducting fibers each having a light-conducting core of a material of relatively high index of refraction and a light-insulating cladding of a material of relatively low index of refraction, assembling the fibers in side-by-side relation to form a bundle, progressively heating the bundle to a fusing and drawing temperature of the fiber materials from one end of the bundle to the other, continuously drawing out the fibers from said one end of the bundle as the fiber materials are heated to drawing temperature for reducing the cross-sectional size of the fibers to a uniform extent throughout a substantial length of the fibers, twisting the fibers to a selected extent in one direction during drawing of the fibers for fusing the bundle fibers securely together to form a multifiber structure, cooling the multifiber structure, progressively heating the multifiber structure to a drawing temperature of the fiber materials from one end of the multifiber structure to the other, continuously drawing out the multifiber structure from said one end thereof as said fiber materials are heated to said drawing temperature for reducing the cross-sectional size of the fibers to a further, uniform extent throughout a substantial length of the fibers, and twisting the multifiber structure during drawing thereof in a direction opposite to the twist in the fibers embodied therein for removing said twist from said fibers.

5. The method of making a light-conducting multifiber structure for use in forming image-transfer devices comprising the steps of providing a plurality of light-conducting fibers each having a light-conducting core of a material of relatively high index of refraction and a light-insulating cladding of a material of relatively low index of refraction, assembling the fibers in side-by-side relation to form a bundle, progressively heating the bundle to a fusing and drawing temperature of the fiber materials from one end of the bundle to the other, continuously drawing out the fibers from said one end of the bundle a first time as the fiber materials are heated to drawing temperature for reducing the cross-sectional size of the fibers to a uniform extent throughout a substantial length of the fibers, twisting the fibers to a selected extent in one direction during said first drawing of the fibers for fusing the bundle fibers securely together to form a multifiber structure, cooling the multifiber structure, progressively heating the multifiber structure to a drawing temperature of the fiber materials from one end of the multifiber structure to the other, and continuously drawing out the multifiber structure from said one end thereof a second time as the fiber materials are heated to said drawing temperature for reducing the cross-sectional size of the fibers to a further, uniform extent throughout a substantial length of the fibers and for distributing twist imparted to the bundle fibers in said first drawing over a substantial length of the multifiber structure.

References Cited

UNITED STATES PATENTS

| | | | |
|---|---|---|---|
| 2,608,722 | 9/1952 | Stuetzer | 65—4 X |
| 2,980,957 | 4/1961 | Hicks | 65—2 |
| 2,992,587 | 7/1961 | Hicks et al. | 65—4 X |
| 3,050,907 | 8/1962 | Hicks. | |
| 3,119,678 | 1/1964 | Bazinet. | |

DONALL H. SYLVESTER, *Primary Examiner.*

HOWARD R. CAINE, *Examiner.*

P. GOLDSTEIN, G. R. MYERS, *Assistant Examiners.*